Patented July 11, 1933

1,917,823

UNITED STATES PATENT OFFICE

EDGAR C. BRITTON AND RALPH P. PERKINS, OF MIDLAND, MICHIGAN, ASSIGNORS TO THE DOW CHEMICAL COMPANY, OF MIDLAND, MICHIGAN, A CORPORATION OF MICHIGAN

METHOD FOR MANUFACTURE OF CYCLOHEXYLPHENOLS

No Drawing. Application filed October 23, 1931. Serial No. 570,654.

The present invention concerns a method of making cyclohexylphenols from phenol and suitable cyclohexenic source-material. This application is a continuation in part of our prior application Serial No. 481,350, filed September 11, 1930.

We have found that a phenol will react with a cyclohexene or the equivalent thereof such as a cyclohexanol, to form a product essentially comprising ortho- and para-cyclohexylphenols as major products along with a relatively small fraction of a meta-cyclohexylphenol as a minor product provided that ortho-, meta-, and para-positions are unsubstituted in the phenol employed as a reactant so that said ortho-, meta-, and para-products may be formed. We further have found that said ortho compound can be converted into the corresponding para compound, and that by adding an ortho-cyclohexylphenol to the reaction mixture, the formation of additional ortho compound is substantially inhibited.

Our invention, then, consists of the method hereinafter fully described and particularly pointed out in the claims, the following description setting forth in detail several modes of carrying out our invention, such disclosed modes illustrating, however, but several of the various ways in which the principle of our invention may be used.

In carrying out our improved method, we react in a phenol with a cyclohexene or other suitable source material capable of yielding a cyclohexene, such as a cyclohexanol, in the presence of a suitable silicic catalyst, e. g. fuller's earth or other bleaching earth, clay, silica gel, Tonsil, or other siliceous material, with or without a solvent, whereby is obtained a product comprising essentially an ortho-cyclohexylphenol and a para-cyclohexylphenol, together with higher condensation products. The phenol preferably is present in excess, i. e. in approximately 1½ to 10 times the theoretical amount, and the catalyst present in a quantity representing from about 1 to 10 per cent of the weight of phenol employed. Such excess of phenol is desirable in that it tends to prevent the formation of poly-cyclohexyl-substituted phenols.

The reactants may be mixed either hot or cold. For instance, the phenol may be heated to the desired temperature and the cyclohexenic source-material added thereto in either hot or cold condition.

The reaction may be carried out at any temperature between 100° and 350° C., and under atmospheric or superatmospheric pressure. We have found that the relative proportions of ortho- and para-cyclohexylphenol in the product vary according to the reaction temperature employed. The proportion of the para compound, in the mixture of cyclohexylphenol products, appears to be maximum when said compounds are formed at a reaction temperature above 160° C. or thereabout.

After substantial completion of the reaction, the crude reaction mixture is treated in any preferred way to separate the desired products therefrom. For instance, the crude product may be fractionally distilled to substantially separate the unreacted phenol, cyclohexylphenols, and other products, or after the unreacted phenol is removed by fractional distillation the remaining crude mixture may be separated into the components thereof by fractional crystallization from a suitable organic solvent. For example, para-cyclohexylphenol may be recrystallized from benzene, toluene, chlorobenzene, ortho-dichlorobenzene, naphtha, etc., whereas ortho-cyclohexylphenol may be recrystallized from solvents such as carbon tetrachloride or petroleum ether. Still another mode of procedure is to remove the unreacted phenol, dissolve the residual mixture in aqueous sodium hydroxide solution and crystallize sodium para-cyclohexylphenate therefrom, which latter compound may then be converted into free para-cyclohexylphenol in any desired way. The residual solution which contains sodium ortho-cyclohexylphenate, may be acidified and the precipitate fractionally distilled to separate ortho-cyclohexylphenol therefrom.

Our invention may be carried out in any one of several ways. For instance, if the process is to be carried out to prepare para-cyclohexylphenol from phenol and cyclohexene or source-material yielding the latter, such components are reacted to obtain a product which may be fractionally distilled or otherwise treated to separate para-cyclohexylphenol therefrom, the other compounds, e. g. phenol, ortho-cyclohexylphenol, and cyclohexylphenyl ether, if present, being returned to the process together with sufficient added phenol and cyclohexene or equivalent thereof. By thus returning ortho-cyclohexylphenol to the process, the formation of additional ortho compound is substantially avoided, the final product comprising essentially para-cyclohexylphenol accompanied by a relatively small amount of the corresponding ortho compound and tar. On the other hand, a similar addition of para-cyclohexylphenol to be mixed reactants (phenol and cyclohexene) does not appear to prevent the formation of additional para-cyclohexylphenol in usual amount.

Again, if it is desired to convert ortho-cyclohexylphenol into the corresponding para-compound, the former is heated in the presence of at least one of the abovementioned catalysts with or without the presence of added phenol, preferably with agitation of the reaction mixture, under any suitable pressure, whether atmospheric, increased or reduced pressure, and at a temperature between approximately 175° and 350° C., thereby forming a mixture of the ortho and para compounds which may be separated into the constituents thereof. For instance, we have heated ortho-cyclohexylphenol together with phenol and Tonsil at about 200° C. for 5 hours as just described, then removed the catalyst from the crude reaction mixture, and fractionally distilled the latter to obtain the mixed cyclohexylphenols which then were dissolved in about twice their volume of hot 15 per cent aqueous sodium hydroxide solution and cooled, whereby the sodium salt of the para compound crystallized therefrom. Para-cyclohexylphenol cannot, under conditions similar to those described above, be converted to ortho-cyclohexylphenol to an appreciable extent.

The following examples illustrate several of the various modes of carrying out our invention:—

Example 1

A reaction mixture, consisting of 1200 grams (15 moles) of cyclohexene, 5650 grams (60 moles) of phenol, and 300 grams of fuller's earth, was heated in an iron bomb during an 8 hour period, the reaction temperature being gradually raised to 257° C. during the heating operation. The reaction mass was then removed from the bomb, filtered to remove fuller's earth therefrom, and fractionally distilled. There was obtained 2250 grams (12.8 moles) of mixed ortho- and para-cyclohexylphenols, the yield of cyclohexylphenols being 85 per cent of theoretical based on the quantity of cyclohexene used. From the mixture of cyclohexylphenols there were subsequently separated 877 grams of para-cyclohexylphenol and 1307 grams of ortho-cyclohexylphenol, both products being recovered as substantially pure compounds.

Example 2

A reaction mixture consisting of 2500 grams (25 moles) of cyclohexanol 3760 grams (40 moles) of phenol, and 300 grams of Tonsil, was heated, during a 3 hour period, in an iron bomb, the temperature being increased gradually from 215° to 250° C. during the heating operation. The reaction mixture was then removed from the bomb, filtered to separate Tonsil therefrom, and fractionally distilled. There were obtained approximately 2215 grams of unreacted phenol, 80 grams of a mixture consisting of cyclohexylphenyl ether and ortho-cyclohexylphenol, 1600 grams of ortho-cyclohexylphenol, 900 grams of para-cyclohexylphenol, and 650 grams of higher condensation products. The total yield of cyclohexylphenols was approxmately 67 per cent of theoretical, based on the quantity of cyclohexene used.

Example 3

A reaction mixture, consisting of 750 grams (8 moles) of phenol and 40 grams of Tonsil was heated to 230° C. in an autoclave and 200 grams (2 moles) of cyclohexanol was added to the heated mixture. The mixture was maintained at 230° C., with stirring, during a 0.5 hour period. The reaction products were separated through procedure similar to that described in Example 2, 543 grams of unreacted phenol, 280 grams of mixed ortho- and para-cyclohexylphenols, and 29 grams of higher condensation products being obtained thereby. The yield of cyclohexylphenols was approximately 80 per cent of theoretical, based on the quantity of cyclohexanol used.

Example 4

A reaction mixture, consisting of 220 grams of phenol, 64 grams of cyclohexene, and 11 grams of Tonsil, was heated in an iron bomb at 106° to 112° C. during an 8 hour period. The reaction mass was then removed from the bomb and fractionally distilled. There was obtained 140 grams of phenol, 118 grams of mixed cyclohexylphenols, and 15.5 grams of tarry residue. The cyclohexylphenol fraction was found to contain approximately 77 grams of ortho-cyclohexylphenol and about 41 grams of the paraisomer. The yield of mixed cyclohexylphenols was 86 per cent of theoretical, based on the quantity of cyclohexene used.

Example 5

In a series of four condensations of cyclohexene with phenol, the reaction product obtained in each run was fractionally distilled to obtain para-cyclohexylphenol (B. P. 180°–182° C. at 25 mm. pressure) as the desired product. The fractions comprising phenol, ortho-cyclohexylphenol (B. P. 168°–170° C. at 25 mm.) and mixed ortho and para compounds (B. P. 170°–180° C. at 25 mm.) were returned to the next reaction mixture to replace equivalent amounts of cyclohexene and phenol. The residual tar fraction was discarded.

The four runs were carried out in 4, 9, 6, and 8 hours, respectively, at a temperature of about 195°–210° C. The first run started with 5650 grams (60 moles) of phenol and 1200 grams (15 moles) of cyclohexene. The crude reaction product obtained thereby, was fractionally distilled, yielding approximately 4250 grams of phenol, 1000 grams of ortho-cyclohexylphenol, 1350 grams of para-cyclohexylphenol, and 200 grams of tar. The charge for the second run consisted of the phenol and ortho-cyclohexylphenol fractions from the first run plus approximately 1400 grams of phenol and 750 grams of cyclohexene. The second reaction product was fractionally distilled as above, the phenol and ortho-cyclohexylphenol fractions being returned to the succeeding charge. The third and fourth runs were made similarly. The four runs utilized a total of 4334 grams (46.1 moles) of phenol and 3513 grams (43.9 moles) of cyclohexene, thereby yielding approximately 1100 grams (6.25 moles) of ortho-cyclohexylphenol, 5500 grams (31.25 moles) of para-cyclohexyphenol, and 900 grams of tar. The ortho and para compounds were obtained in 14 per cent and 71 per cent yields, respectively, based on the cyclohexene, the total yield of cyclohexylphenols being approximately 85 per cent. By continuing the process, the yield of para compound accordingly will approach more closely to the total yield of cyclohexylphenols.

Example 6

A mixture, consisting of 210 grams of phenol, 71.5 grams of 1-methyl-cyclohexene, and 10.5 grams of Tonsil, was maintained at between 105° and 145° C. during a 7 hour period. The reaction mass was fractionally distilled, 15 grams of unreacted 1-methyl-cyclohexene, 161 grams of phenol, 90 grams of nearly pure p-(1-methyl-cyclohexyl)-phenol, and 14 grams of a tarry residue being obtained thereby. The yield of p-(1-methyl-cyclohexyl)-phenol was approximately 80.3 per cent of theoretical, based upon the quantity of 1-methyl-cyclohexene employed and not recovered as unreacted material.

Example 7

A mixture, consisting of 225 grams of ortho-cresol, 57 grams of cyclohexene, and 11 grams of Tonsil was heated, in an iron bomb, at between 190° and 205° C. during a 2.5 hour period. The reaction mass was filtered and then fractionally distilled, 150 grams of unreacted ortho-cresol, 116 grams of a mixture of cyclohexylcresols, and 12 grams of a tarry residue being obtained thereby. Upon crystallization of the cyclohexylcresol mixture from solvent naphtha there was isolated p-cyclohexyl-o-cresol, of melting point 78° to 78.5° C. and of boiling point 180° to 181° C. at 25 millimeters pressure.

When preparing cyclohexylphenols from phenol and cyclohexene or cyclohexanol according to our method, a relatively small fraction of meta-cyclohexylphenol is formed along with its ortho- and para-isomers as major products. Meta-cyclohexylphenol may be separated from the mixture of the same isomeric compounds by fractionally distilling said mixture so as to remove most of the ortho-cyclohexylphenol therefrom, converting the meta- and para-cyclohexylphenols to their sodium salts, separating sodium para-cyclohexylphenate through fractional crystallization of said sodium salts from water, acidifying the sodium meta-cyclohexylphenate fraction to liberate meta-cyclohexylphenol, and purifying the latter through recrystallization from an organic solvent, e. g. petroleum ether. Purified meta-cyclohexylphenol, which is obtained as fine white needles, melts at approximately 54° to 55° C. and boils at approximately 180° C. under 25 millimeters of pressure. When preparing cyclohexylphenols according to our improved method, meta-cyclohexylphenol is generally formed in an amount representing from 1 to 5 per cent of the weight of the mixed cyclohexylphenol products.

While we may form cyclohexylphenols by reacting a phenol with a cyclohexene or equivalent thereof in the presence of a siliceous catalyst at any temperature between 100° and 350° C., we prefer to carry the reaction out at a temperature between 175° and 350° C. At temperatures below 175° C. some intermediate products, such as cyclohexylphenyl ether are sometimes obtained. When the reaction is carried out at temperatures between 175° and 350° C. such intermediate products are largely converted into cyclohexylphenols.

We do not limit our invention to the specific reaction components mentioned in the example. For instance, phenols, containing no reactive groups other than the hydroxyl group (e. g. the various cresols, alkyl, alkoxy, aryloxy and aralkoxy substituted phenols, phenylphenols, etc.), in general, may be reacted with cyclohexene cyclohexanol, or suitable derivatives thereof, such as the hydrocarbon derivatives thereof, e. g. methyl cyclohexene, or methylcyclohexanol, as above described.

In summary, the present invention comprises:—

(a) Reacting a phenol with cyclohexene or equivalent thereof, at a temperature between 100° and 350° C. and in the presence of a siliceous catalyst, to form a cyclohexylphenol;

(b) Reacting a phenol, having the general formula

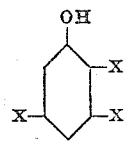

wherein X represents hydrogen or a substituent selected from the group consisting of hydrocarbon, alkoxy, aryloxy, or aralkoxy substituents, with cyclohexene or equivalent thereof, under reaction conditions similar to those described in (a), to form ortho- and para-cyclohexylphenols conjointly;

(c) When operating according to procedure similar to that described in (b), adding the ortho-cyclohexylphenol compound, which is generally formed as a product from the reaction involved, to the reaction mixture to promote the formation of a para-cyclohexylphenol and inhibit the further formation of a ortho-cyclohexylphenol;

(d) Reacting phenol with cyclohexene or equivalent thereof at a temperature between 100° and 350° C. to form ortho-cyclohexylphenol and its meta- and para-isomers conjointly.

By the expression "cyclohexenic source-material" as used in the specification and claims, we mean a cyclohexene or other compound capable of yielding a cyclohexene, under the conditions in which the reaction is carried out, to react with the phenolic compound. Similarly, the expression "cyclohexene source-material" shall be understood to mean cyclohexene or a compound capable of forming cyclohexene under the conditions in which the reaction is carried out.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method of making a cyclohexylphenol, which comprises reacting a monohydric phenol with a cyclohexenic source-material in the presence of a siliceous catalyst.

2. The method of making a cyclohexylphenol, which comprises reacting a monohydric phenol with a cyclohexenic source-material at a temperature between 100° and 350° C. and in the presence of a siliceous catalyst.

3. The method of making a cyclohexylphenol, which comprises reacting a monohydric phenol with a cyclohexenic source-material under superatmospheric pressure, at a temperature between 100° and 350° C. and in the presence of a siliceous catalyst.

4. The method of making a cyclohexylphenol, which comprises reacting a monohydric phenol with a cyclohexenic source-material, under superatmospheric pressure, at a temperature between 175° and 350° C. and in the presence of a siliceous catalyst.

5. The method of making an ortho-cyclohexylphenol and its para-isomer conjointly, which comprises reacting a phenol, having the general formula;

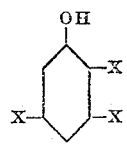

wherein X represents hydrogen or a substituent selected from the group consisting of hydrocarbon, alkoxy, aryloxy, and aralkoxy substituents, with a cyclohexenic source-material in the presence of a siliceous catalyst.

6. The method of making an ortho-cyclohexylphenol and its para-isomer conjointly, which comprises reacting a phenol, having the general formula;

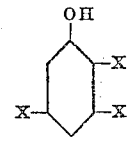

wherein X represents hydrogen or a substituent selected from the group consisting of hydrocarbon, alkoxy, aryloxy and aralkoxy substituents, with a cyclohexenic source-material at a temperature between 100° and 350° C. and in the presence of a siliceous catalyst.

7. The method of making an ortho-cyclohexylphenol and its para-isomer conjointly, which comprises reacting a phenol, having the general formula;

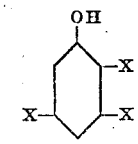

wherein X represents hydrogen or a substituent selected from the group consisting of hydrocarbon, alkoxy, aryloxy and aralkoxy substituents, with a cyclohexenic source-material, under superatmospheric pressure, at a temperature between 175° and 350° C. and in the presence of a siliceous catalyst.

8. The method of making ortho- and para-cyclohexylphenols conjointly, which comprises reacting phenol with a cyclohexene source-material in the presence of a siliceous catalyst.

9. The method of making ortho- and para-cyclohexylphenols conjointly, which comprises reacting phenol with a cyclohexene source-material at a temperature between 100° and 350° C. and in the presence of a siliceous catalyst.

10. The method of making cyclohexylphenols, which comprises heating a mixture of phenol and cyclohexene source-material in a molecular ratio between 1½ to 1 and 10 to 1, respectively, together with a siliceous catalyst, at a temperature between 100° and 350° C. and then separating ortho- and para-cyclohexylphenols therefrom.

11. The method of making ortho- and para-cyclohexylphenols conjointly, which comprises reacting phenol with cyclohexene under superatmospheric pressure, at a temperature between 100° and 350° C. and in the presence of a siliceous catalyst, said reactants being employed in the ratio of from 1.5 to 10 chemical equivalents of phenol for each chemical equivalent of cyclohexene.

12. The method of making cyclohexylphenols, which comprises adding cyclohexenic source-material to phenol in which latter there is included a siliceous catalyst and which is heated to a temperature between 100° and 350° C., agitating the mixture during the reaction, filtering the reaction mixture from the catalyst, and separating ortho- and para-cyclohexylphenols from said reaction mixture.

13. In a method of making a cyclohexylphenol by reacting a monohydric phenol with cyclohexenic source-material, the step of adding the latter to the phenol which is at a temperature between 100° and 350° C.

14. The method of making cyclohexylphenols, which comprises adding cyclohexene to phenol in which latter there is included a siliceous catalyst and which is heated to a temperature between 100° and 350° C., agitating the mixture during the reaction, then separating ortho- and para-cyclohexylphenols therefrom.

15. The process of making a para-cyclohexylphenol, which comprises reacting a phenol, having the general formula:

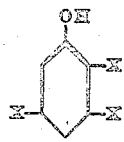

wherein X represents hydrogen or a substituent selected from the group consisting of hydrocarbon, alkoxy, aryloxy, and aralkoxy substituents, with a cyclohexenic source-material in the presence of a siliceous catalyst, separating the ortho- and para-cyclohexylphenols from the reaction mixture and return the ortho-product to the process.

16. The process of making para-cyclohexylphenol, which comprises reacting phenol with cyclohexene source-material at a temperature between 175° and 350° C. and in the presence of a siliceous catalyst, separating ortho- and para-cyclohexylphenols from the crude reaction mixture and returning said ortho compound to the process.

17. The process of making para-cyclohexylphenol, which comprises reacting phenol with cyclohexene in the presence of a siliceous catalyst, separating ortho- and para-cyclohexylphenols from the crude reaction mixture and returning said ortho compound to the process.

18. The process of making para-cyclohexylphenol, which comprises reacting phenol with cyclohexene and cyclohexylphenol at a temperature between 175° and 350° C. and in the presence of a siliceous catalyst, fractionally distilling the crude reaction mixture to separate ortho- and para-cyclohexylphenols therefrom, and returning said ortho compound to the process.

19. In a process of the herein described nature for making para-cyclohexylphenol by reacting phenol with cyclohexenic source-material, the step of returning ortho-cyclohexylphenol formed in the reaction to the process.

20. In a process of making para-cyclohexylphenol, converting ortho-cyclohexylphenol into the corresponding para compound by heating the former to a temperature between 175° and 350° C. in the presence of a siliceous catalyst.

21. The method of making ortho-, meta-, and para-cyclohexylphenols conjointly, which comprises reacting phenol with a cyclohexene source-material at a temperature between 100° and 350° C. and in the presence of a siliceous catalyst, and separating ortho-, meta-, and para-cyclohexylphenol from the reaction mixture.

22. The method of making an ortho-cyclohexylphenol and its para-isomer conjointly, which comprises reacting a phenol, having the general formula,

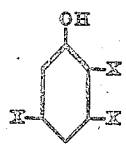

wherein X represents hydrogen or a substituent selected from the group consisting of hydrocarbon, alkoxy, aryloxy and aralkoxy substituents, with cyclohexene under superatmospheric pressure, at a temperature between 175° and 350° C., and in the presence of a siliceous catalyst.

Signed by us this 20th day of October, 1931.

EDGAR C. BRITTON.
RALPH P. PERKINS.

CERTIFICATE OF CORRECTION.

Patent No. 1,917,823.                                                            July 11, 1933.

EDGAR C. BRITTON, ET AL.

It is hereby certified that error appears in the printed specification of the above numbered patent requiring correction as follows: Page 1, line 33, strike out the word "in"; page 2, line 20, for "be" read "the"; and line 94, for "approxmately" read "approximately"; page 3, line 90, before "isomeric" insert "with"; and line 126, for "example" read "examples"; page 4, line 34, for "a" read "an"; page 5, line 65, claim 15, for "return" read "returning"; and line 83, claim 18, after "and" insert "ortho-"; and that the said Letters Patent should be read with these corrections therein that the same may conform to the record of the case in the Patent Office.

Signed and sealed this 29th day of August, A. D. 1933.

M. J. Moore.

(Seal)                                             Acting Commissioner of Patents.